(12) United States Patent
Barusseau et al.

(10) Patent No.: US 6,998,536 B2
(45) Date of Patent: Feb. 14, 2006

(54) CABLE SHEATH INCLUDING A HALOGEN-FREE INTUMESCENT COMPOSITION

(75) Inventors: Sylvie Barusseau, Le Plessis Pate (FR); Françoise Ducatel, Bonnelles (FR); Aziza Gouchi, Marcoussis (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/391,595

(22) Filed: Mar. 20, 2003

(65) Prior Publication Data

US 2003/0178220 A1    Sep. 25, 2003

(30) Foreign Application Priority Data

Mar. 21, 2002  (FR) .................................. 02 03551

(51) Int. Cl.
    *H01B 7/00*    (2006.01)
(52) U.S. Cl. ............................. 174/110 R; 174/120 R; 174/121 A
(58) Field of Classification Search ............ 174/110 R, 174/110 AR, 110 PM, 110 FC, 113 R, 116, 174/120 R, 120 AR, 121 R, 121 A
See application file for complete search history.

(56) References Cited

U.S. PATENT DOCUMENTS

| | | | | |
|---|---|---|---|---|
| 4,018,962 A | * | 4/1977 | Pedlow | 442/138 |
| 4,513,173 A | * | 4/1985 | Merry | 174/121 A |
| 4,514,466 A | * | 4/1985 | Leon et al. | 428/383 |
| 4,722,959 A | * | 2/1988 | Inoue et al. | 524/412 |
| 4,791,160 A | * | 12/1988 | Kato et al. | 524/322 |
| 4,881,794 A | * | 11/1989 | Bartoszek | 385/102 |
| 5,173,515 A | * | 12/1992 | von Bonin et al. | 521/103 |
| 5,256,718 A | * | 10/1993 | Yamamoto et al. | 524/411 |
| 5,364,898 A | * | 11/1994 | Lee et al. | 524/265 |
| 5,397,822 A | * | 3/1995 | Lee, Jr. | 524/127 |
| 5,418,272 A | * | 5/1995 | Kawabata et al. | 524/436 |
| 5,475,041 A | * | 12/1995 | Weil et al. | 524/100 |
| 5,698,615 A | * | 12/1997 | Polle | 523/173 |
| 5,744,757 A | * | 4/1998 | Kenny et al. | 174/113 R |
| 5,770,820 A | * | 6/1998 | Nelson et al. | 174/113 R |
| 6,410,137 B1 | * | 6/2002 | Bunyan | 428/356 |
| 6,492,453 B1 | * | 12/2002 | Ebrahimian et al. | 524/447 |
| 6,674,009 B1 | * | 1/2004 | Fomperie et al. | 174/110 R |
| 6,740,396 B1 | * | 5/2004 | Carrus et al. | 428/331 |

FOREIGN PATENT DOCUMENTS

| | | |
|---|---|---|
| EP | 0 081 004 A1 | 6/1983 |
| EP | 001026700 A2 * | 9/2000 |
| FR | 1 033 724 A1 * | 2/2000 |

OTHER PUBLICATIONS

Database WPI Sectiion Ch, Week 199302 Derwent Publications Ltd., London, GB; An 1993-014155, XP002219445 & JP 04 342764 A, Nov. 30, 1992.

* cited by examiner

*Primary Examiner*—William H. Mayo, III
(74) *Attorney, Agent, or Firm*—Sughrue Mion, PLLC

(57) ABSTRACT

The present invention relates to a sheath (7) for a cable (1), where the sheath contains, at least in part, a halogen-free intumescent composition. The composition of the sheath contains a mixture of a polymer matrix chosen from a polyethylene, a polypropylene, an ethylene copolymer, a propylene copolymer, a silicone, a polyamide, and a mixture thereof and at least one flame-retardant additive. The flame retardant additive has a first inorganic compound having a lamellar crystal structure, and a second inorganic compound inserted between the lamellae of the first compound, where the second compound causes the lamellae to move apart under the application of heat.

29 Claims, 2 Drawing Sheets

Each conductor 2 will be depicted as: (center of conductor 2 will be shown as "refractory material").

CABLE SHEATH INCLUDING A HALOGEN-FREE INTUMESCENT COMPOSITION

BACKGROUND OF THE INVENTION

1. Field of the Invention

The present invention relates to a cable sheath having an intumescent composition that contains no halogen, and it relates in particular to a flame-retardant cable sheath, in particular for a telecommunications cable. The invention also relates to a cable whose properties, in particular its flame-retardant properties, are significantly improved compared with currently known cables.

2. Description of the Related Art

Cable, in particular cable used for telecommunications is made up of one or more cores surrounded by a protective covering made up of one or more layers. The core can be a metal core or an optical-fiber core. The covering surrounding the core is made up of layers having various properties, e.g. insulating properties or water-repellent properties. When the cable is made up of a plurality of individually covered cores, they are brought together to form a bundle. The bundle is also surrounded by a sheath in which at least one layer (usually the outer layer) is made from a composition imparting flame-retardant properties to it.

Materials used for cable sheath have to satisfy certain requirements. They must not be pollutant or toxic. They must offer good fire-resistance and ignition retardancy. Their combustion must not give rise to high smoke emission. It is also desirable for the smoke given off to be of low opacity, of low toxicity, and of low corrosiveness. In addition sheathing materials must offer good resistance to deformation when they are exposed to heat. In particular when the materials melt under the effect of the heat, the drops formed as they melt give rise to risks of causing burns, and they can also cause the fire to spread by generating new starting points from which fire can break out.

To form such a layer, compositions are known that are based on polymers and that contain flame-retardant additives. The current trend is to seek to replace polymer compositions that include halogen-containing additives and that have hitherto been used for cable insulation sheathing. Standards are tending to prohibit the use of such additives not only because of the toxicity and corrosiveness of the products given off when they burn, but also because they constitute possible health hazards while they are being manufactured and while they are being incinerated. In addition, the current trend is to give preference to implementing substances that are easily degradable or even recyclable. Such materials for retarding propagation of flames and fire and that do not contain halogens are often referred to as "halogen-free fire retardants" (HFFRs).

One known solution for making polymer cable sheaths more fire-resistant consists in adding a filler constituted by a metal hydroxide such as Al(OH)3 or Mg(OH)2. Unfortunately, it is necessary to add a considerable quantity of filler in order to obtain sufficient protection from flames. It is then observed that the mechanical and electrical properties of the material are degraded. Furthermore, such compositions have high viscosity, and they are therefore difficult to implement, in particular by extrusion.

Compositions are also known that contain associations of silicone oil, of calcium carbonate, and of magnesium stearate. However, the performance of such compositions still leaves room for improvement.

Additives are known for causing intumescence, i.e. swelling, of a polymer composition, but they suffer from drawbacks. Thus, pentaerythritol, which is often used, starts to decompose at 200° C., which might pose problems during extrusion. Melamine, also used as a char-forming agent, significantly increases the concentration of cyanide ions in the degradation products.

Document EP-1 026 700 discloses a cable sheath made of a halogen-free material composed of a polymer, of an intumescent component which causes the material to swell, and of an inorganic glass former which forms a flame-resistant inorganic foam. That cross-linkable composition also includes silanes or peroxides as cross-linking agents. The extruded sheaths are cross-linked statically in a separate step, after the cable has been extruded. That method results in full cross-linking, and in a material that is difficult to recycle.

SUMMARY OF THE INVENTION

An object of the present invention is to provide a cable sheath including a halogen-free intumescent composition that simultaneously offers good mechanical properties and good flame-retardant properties. More generally, the invention provides a cable sheath that does not suffer from the drawbacks of the prior art.

This problem is solved by a sheath for a cable, the sheath comprising, at least in part, a halogen-free intumescent composition. The composition contains a mixture of a polymer matrix and of at least one flame-retardant additive. The matrix is chosen from a polyethylene, a polypropylene, an ethylene copolymer, a propylene copolymer, a silicone, a polyamide, and a mixture thereof. The additive is constituted by a first inorganic compound having a lamellar crystal structure, and by a second inorganic compound inserted between the lamellae of said first compound, said second compound being capable of causing said lamellae to move apart under the effect of heat.

The first compound may be chosen from a graphite and a silicate having a lamellar structure and referred to as a "phyllosilicate", such as a mica or a clay. Among such clays, it is possible to use a talc, a vermiculite, a kaolinite, a smectite, or any mixture of these clays. From the smectite group, it is possible, in particular, to choose montmorillonite, bentonite, beidellite, nontronite, saponite, hectorite, or a mixture thereof.

In a preferred embodiment of the invention, the first compound is a graphite. The graphite has a crystal structure made up of carbon atoms formed of planes stacked up parallel to one another. Molecules of another inorganic compound can be inserted between said planes. Inserting such molecules between the planes of the graphite makes it possible to obtain a flame-retardant additive of the present invention, which is constituted by an "expandable" graphite. When an expandable graphite is exposed to heat or to a flame, the inserted molecules decompose, thereby generating gas. The pressure of the gas forces the graphite planes apart, and the graphite expands. The expanded graphite has a low density, it is not combustible, and it is a good heat insulator because it reflects up to 50% of the radiating heat.

An expandable graphite is a substance that is commercially available. The following table gives examples of commercially-available expandable graphite that can be used in the present invention.

TABLE 1

| Supplier | Product reference | Flake size | Start-of-expansion temperature | Expansion volume at 1000° C. |
|---|---|---|---|---|
| Nissho Iwai | SS-100 | 100 to 200 μm | >200° C. | |
| | SSFF | 300 to 500 μm | >200° C. | |
| Timcal | KH80 | | | |
| NGS naturgraphit | EX 100 SC | ≧300 μm | 250° C. | 350 cm³/g |
| | EX CX325 HMY | ≦45 μm | 250° C. | 20 cm³/g |
| | EX EF95 HMY | ≦150 μm | 250° C. | 100–110 cm³/g |
| | EX 8580 170 HMY | 150 to 300 μm | 230° C. | 170 cm³/g |
| Carbone Lorraine | Graphex CK 23 | 480 μm | >200° C. | 290 cm³/g |

Preferably, the chosen expandable graphite has a flake size of no less than 45 μm, preferably no less than 100 μm, and even more preferably no less than 300 μm.

The function of the second inorganic compound is to cause the lamella between which it is inserted to move apart under the effect of heat. This is achieved by the pressure exerted by the molecules of the second compound on the lamellae. This pressure may be due to an increase in volume or to a change in physical state caused by the rise in temperature. In a particular embodiment, the second inorganic compound has the property of decomposing by giving off gas under the effect of heat. Preferably, a strong acid such as sulfuric acid H2SO4 is chosen.

The matrix is a polymer or a mixture of polymers that are usually used for cable sheathing. The matrix is preferably a polymer of a mixture of polymers chosen from a thermoplastic polymer and an elastomer, preferably a thermoplastic elastomer. The matrix is preferably chosen from a polyethylene (PE), a polypropylene (PP), and copolymers thereof, a silicone, a polyamide (PA), and a mixture thereof. Among the ethylene copolymers, it is possible to choose an ethylene and vinyl acetate copolymer (EVA), an ethylene and propylene copolymer (EPR, EPM, or EPDM), an ethylene and alkyl acrylate copolymer (EBA, EEA, or EMA), an ethylene and acrylic acid copolymer, an ethylene terpolymer, the same polymers having specific groups such as acid or epoxy groups, and mixtures thereof. Preferably, the polymer is a thermoplastic polymer, in particular an ethylene and vinyl acetate copolymer (EVA). Preferably, use is made of an EVA containing up to 80% by weight of vinyl acetate, and more preferably in the range 10% by weight to 70% by weight of vinyl acetate. The polymer matrix preferably represents in the range 25 parts by weight to 85 parts by weight of the composition, and more preferably 30% by weight to 85% by weight.

In a variant, the composition contains an antioxidant. For example, use may be made of 4,4'-thiobis (6-tert-butyl-m-cresol) which is an antioxidant used, in particular, for natural or synthetic elastomers, in particular the compound referenced "SANTONOX TBMC" supplied by FLEXSYS. The quantity of antioxidant in the composition preferably lies in the range 0.05 parts to 2 parts, and in particular 0.1 parts to 1 part by weight.

In another variant, the composition contains a compound referred to as a "char source" and which acts to supply a large volume of char to slow combustion down. As a char source, it is possible to use organic compounds that are rich in carbon, and that contain functional groups forming char when they are exposed to heat. They may be used on their own or in the presence of a "char enhancer" which amplifies their effect. Thus, it is possible to use polymers such as ethylene vinyl alcohol, and preferably a polyamide such as polyamide 6 (PA 6).

In another variant, the composition contains a char enhancer. The char enhancer is generally chosen from among compounds that release an inorganic acid at high temperature. Preferably, ammonium polyphosphate (APP) which forms polyphosphoric acid is used as the char enhancer.

In yet another variant, the composition further contains a filler which is usually an inorganic compound. The filler is chosen, in particular, from a mica, a clay such as a kaolin or a talc, an inorganic oxide such as a magnesia, a graphite, and mixtures thereof. Naturally, it is also possible to use other fillers commonly used in cable-making. Adding an inorganic filler having a particular structure such as a filler having a lamellar structure (graphite, mica, kaolin, talc, etc.) or comprising pseudo-lamellae (fibrous clay, sepiolite, etc.) or a large specific surface area (molecular sieve, zeolite, etc.), makes it possible to reinforce still further the fire-resistant properties of the composition. In the invention, the filler represents no more than 40 parts by weight of the composition, and preferably no more than 20 parts by weight.

In addition, the composition may also contain other additives commonly used in sheath-making, such as a catalyst or a glass former.

The present invention offers the advantage of improving the fire-resistance of polymer-based cable sheaths. The sheaths of the present invention are of high limiting oxygen index (LOI) and have the properties required to satisfy the tests defined in IEC Standard IEC 332, in particular tests IEC 332-1 and IEC 332-2 relating to the fire-resistance of sheathed copper wires. Compared with known sheaths, the composition of the invention has a low filler content. It has been observed that a high filler content gives rise to degradation of the mechanical characteristics of the material.

To form the sheath of the invention, it is not necessary to cross-link the composition. The composition thus does not contain any cross-linking agent, such as a peroxide or a silane.

The invention also provides a cable made up of at least one core and of at least one sheath comprising, at least in part, the above-described halogen-free intumescent composition.

In a variant, the core is constituted by an optical fiber. The optical fiber is surrounded by a protective coating, and by a sheath, the sheath and/or the coating comprising, at least in part, the composition of the invention.

In another variant, the core is constituted by a metal conductor. The metal core is surrounded by a sheath of the invention comprising, at least in part, the above-described composition.

The invention also provides a method of manufacturing such a cable, said method comprising a step of extruding a halogen-free intumescent composition around said core for forming a sheath, said composition containing a mixture of a polymer matrix chosen from a polyethylene, a polypropylene, an ethylene copolymer, a propylene copolymer, a silicone, a polyamide, and a mixture thereof, and at least one flame-retardant additive constituted by a first inorganic compound having a lamellar crystal structure, and by a second inorganic compound inserted between the lamellae of said first compound.

The invention also provides use of the above-described cable sheath as a flame retardant in telecommunications cables.

BRIEF DESCRIPTION OF THE DRAWINGS

Other characteristics and advantages of the present invention will appear on reading the following description of embodiments given by way of non-limiting illustration, and with reference to the accompanying drawings, in which.

DETAILED DESCRIPTION OF THE INVENTION

Figure 1:
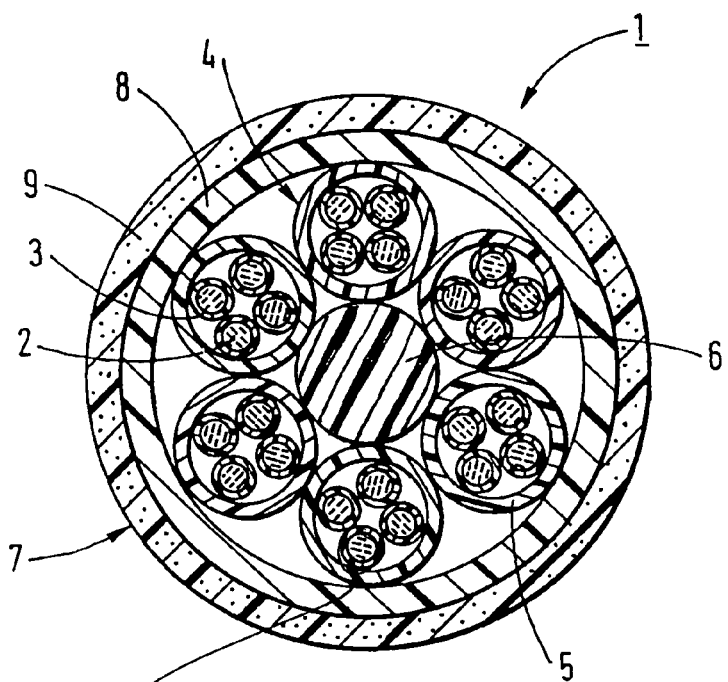
FIG. 1 is a section view through an optical fiber cable including the invention.
Figure 1:

FIG. 1 shows a cable 1 made up of a plurality of cable-cores 2 which, in this example, are made of optical fibers. Each of the optical fibers 2 is made up of an optical core surrounded by optical cladding based on silica. Each of them is covered with a coating 3 that is optionally colored to make it possible to distinguish them from one another. The optical fibers 2 are brought together to form bundles 4 and the fibers in each bundle 4 are held together by a common protective skin 5. The cable 1 of the invention includes a plurality of grouped-together bundles 4 disposed around a strength element 6 and surrounded by a sheath 7 of flexible material that is extruded directly over the bundles 4. The sheath 7 of the invention comprises at least one inner layer 8 and an outer layer 9. The outer layer 9 is made at least in part of a halogen-free flame-retardant composition as described above. The optical fiber cable 1 of the invention is, in particular, usable for telecommunications.

Figure 2:
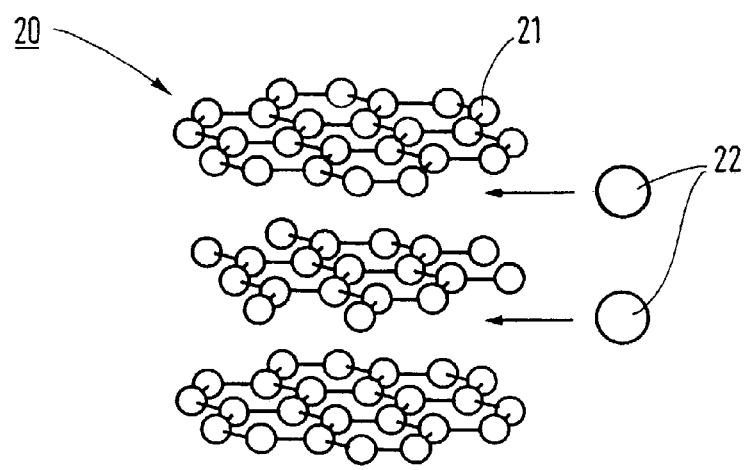
FIG. 2 diagrammatically shows the crystal structure of the graphite, and indicates how an inorganic compound is inserted between the lamellae.
Figure 3A:
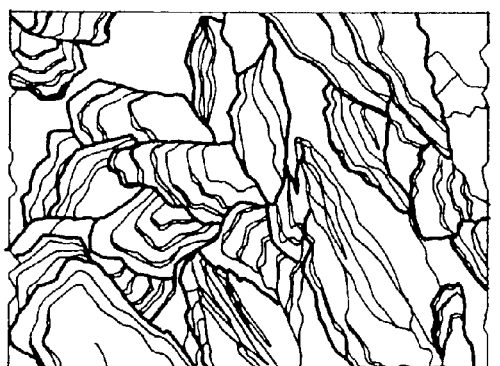
FIGS. 3a and 3b show the appearance of a graphite respectively before and after expansion.
Figure 3B:
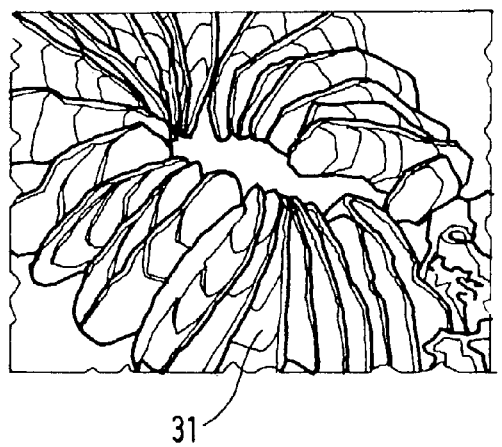

FIG. 2 shows the crystal structure of a graphite that is usable in the present invention. Said structure is made up of crystal planes 20, made up of carbon atoms 21 and between which a molecule 22 can be interposed. FIG. 3a is an electron microscope view of an expandable graphite in its initial state, when it is incorporated into the matrix to obtain the composition of the invention. It is possible to see the superposed crystal planes 30 of the graphite. FIG. 3b shows the same graphite in an expanded state. It can be observed that the planes 31 have moved apart under the effect of heat. Under the action of a flow of heat, the expandable graphite contained in the composition expands, thereby forming a fire barrier that protects the component polymers of the cable sheath from the flames.

EXAMPLE 1

A composition A of the invention was prepared comprising the following:

| | |
|---|---|
| polymer matrix | 100 parts by weight |
| antioxidant | 1 part |
| char source | 7 parts |
| char enhancer | 50 parts |
| flame-retardant additive | 5 parts |

In composition A of the invention, the polymer matrix was an EVA of reference ELVAX 260, supplied by DUPONT DE NEMOURS, containing 28% by weight of vinyl acetate, and having a melt-flow index of 6. In this example, the antioxidant had the reference SANTONOX TBMC supplied by FLEXSYS. A char source was added that was a polyamide PA 6, and a char enhancer was added that was ammonium polyphosphate (APP) of reference EXOLITE AP 422.

The flame-retardant additive was an expandable graphite of reference EX 100Sc, having a flake size greater than 300 μm, and supplied by NGS NATURGRAPHIT GmbH. Composition A contained no halogen and no cross-linking agent. The compositions of the invention are not cross-linked.

The EVA polymer matrix was mixed in a mixer with the polyamide 6 and the antioxidant at a temperature of 230° C. After the mixture had been homogenized and cooled to a temperature of 180° C, the expandable graphite was added, followed by the filler, and finally the ammonium polyphosphate APP. The resulting mixture was shaped to form a sheet for the purpose of determining the fire-resistance characteristics and the mechanical properties of each composition.

EXAMPLE 2

A composition B of the invention that was prepared was analogous to composition A except that it also contained 10 parts by weight of an inorganic filler constituted by kaolin.

EXAMPLE 3

A composition C of the invention was prepared that was analogous to composition A except that is also contained 20 parts by weight of an inorganic filler constituted by kaolin.

EXAMPLE 4

A composition D of the invention was prepared that was analogous to composition A except that it also contained 40 parts by weight of an inorganic filler constituted by kaolin.

EXAMPLE 5

A composition E of the invention was prepared that was analogous to composition D except that the flame-retardant additive was an expandable graphite of reference EX CX 325 HMY having a flake size no larger than 45 μm, supplied by NGS NATURGRAPHIT GmbH.

Table 2 below gives a summary of Examples 1 to 5 of compositions A to E of the invention. The quantities are indicated in numbers of parts by weight relative to the polymer matrix which represents 100 parts.

TABLE 2

| Reference of the composition | A | B | C | D | E |
|---|---|---|---|---|---|
| EVA "ELVAX 260" | 100 | 100 | 100 | 100 | 100 |
| "SANTONOX TBMC" | 1 | 1 | 1 | 1 | 1 |
| PA 6 | 7 | 7 | 7 | 7 | 7 |
| APP "EXOLITE AP 422" | 50 | 50 | 50 | 50 | 50 |
| Kaolin | 0 | 10 | 20 | 40 | 40 |
| Expandable graphite: | | | | | |
| EX 100Sc | 5 | 5 | 5 | 5 | |
| EX CX 325 HMY | | | | | 5 |

EXAMPLE 6

By way of comparison, a composition X was also tested comprising:

| | |
|---|---|
| EVA "ELVAX 260" | 100 parts by weight |
| SANTONOX TBMC | 1 part |
| PA 6 | 7 parts |
| magnesia Mg(OH)2 | 50 parts |

In composition X, the filler was magnesia mg(OH)2.

EXAMPLE 7

By way of comparison, a composition Y was also tested that was analogous to composition X, but that contained 100 parts of filler.

EXAMPLE 8

By way of comparison, a composition Z was also tested that contained:

| | |
|---|---|
| polyethylene (PE and VLDPE) | 100 parts by weight |
| "SANTONOX TBMC" | 1 part |
| CaO3 filler | 60 parts |
| silicone | 8 parts |
| magnesium stearate | 6 parts |

In composition Z, the term "silicone" represents a mixture of equal weights of two silicone oils having respective references PDMS (polydimethyl siloxane) (4 parts) and NG 200 (4 parts).

Under the effect of heat, the silicone and the calcium carbonate filler reacted to form an inorganic barrier of calcium silicate at the surface of the sheath. The magnesium stearate migrates towards the surface of the covering. It decomposes to yield an inorganic residue that reinforces the inorganic barrier of calcium silicate, formation of which it facilitates. The ash remains friable however, and therefore less effective.

ASSESSMENT

Firstly, the mechanical properties of the compositions A to E of the present invention and of the comparative compositions X, Y, and Z were assessed from the point of view of tensile strength at yield R and tensile elongation A in compliance with ASTM Standard ASTM D638. The behavior of the compositions was also observed when they were subjected to the UL94 test established for showing drip behavior of paints and varnishes.

Secondly, their resistance to ignition was assessed. Initially, we measured the limiting oxygen index LOI of each component (ASTM D2863-77A). The fire resistance of the cables was assessed using IEC Standard IEC 332. That standard has three sections, including, in particular, the tests IEC 332-1 and IEC 332-2 relating to the fire resistance of sheathed copper wires.

The previously prepared compositions were firstly pressed to obtain sheets of desired thickness: a thickness of 1 mm for determining mechanical characteristics, and a thickness of 3 mm for determining characteristics using the UL94 test. Secondly, a portion of the composition was extruded over a wire already insulated with a non-flame-retarded mixture (thickness of the insulation: 0.5 mm and thickness of the sheath: 0.5 mm), and the resulting cable was tested in compliance with IEC 332.

The test results are given in Table 3 below.

TABLE 3

| | Invention | | | | | Comparison | | |
|---|---|---|---|---|---|---|---|---|
| Reference | A | B | C | D | E | X | Y | Z |
| R (Mpa) | 10.5 ± 0.7 | 9 ± 1.1 | 8.8 ± 0.6 | 6.6 ± 0.7 | 8.8 ± 0.4 | 9.7 ± 0.9 | 11 ± 0.2 | 20 ± 1.5 |
| A (%) | 580 ± 10 | 540 ± 30 | 530 ± 20 | 420 ± 40 | 580 ± 10 | 580 ± 10 | 80 ± 10 | 690 ± 10 |
| LOI (%) | 30 | 27 | 29 | 30 | 24 | 26 | 43 | 36 |
| UL94 | V0 | V1 | V1 | V0 | V2 | V1 | V2 | V2 |
| IEC 332-1 | + | + | + | 0 | / | / | / | + |
| T (s) | 1'25/0/0 | 0/0/0 | 1'35/0/0 | 1'50/1'35/0 | | | | 25'/0/0 |
| L (cm) | 45/16/21 | 16/20/15 | 45/26/20 | 45/45/16 | | | | 45/18/20 |
| IEC 332-2 | + | + | + | + | / | / | / | 0 |
| T (s) | 0/1'50/0 | 1'45/0/0 | 0/0/0 | 0/2'/0 | | | | |
| L (cm) | 22/45/20 | 45/22/20 | 21/20/21 | 21/45/19 | | | | |

/: not tested
+: test result satisfactory
0: test result unsatisfactory

When the quantity of kaolin filler was increased, we observed a degradation in the mechanical properties of compositions A to D. The same degradation applies for the Mg(OH)2 filler between compositions X and Y.

The limiting oxygen index LOI indicates the flammability of a material in contact with a flame at ordinary temperature. All of the compositions tested had LOI values that were high, and greater than 24. The results given in Table 3 show the means of a plurality of measurements. By way of illustration the values 24% corresponding to the sample referenced E, and the value 26% corresponding to the sample referenced X can be considered to be of the same order of magnitude given the measurement uncertainties.

The compositions of the invention were subjected to the UL94 test. A test bar is fixed horizontally or vertically and held by one of its ends. The free end is exposed to a gas flame under specified conditions. The behavior of the test bar is then assessed using the following ranking system. The rank V0 indicates that the composition stands up well to the test, i.e. the composition does not burn and does not drip when it is exposed to the test conditions. The rank V1 indicates an intermediate behavior level, i.e. the composition does not burn, but it creeps and can drip. The rank V2 indicates that the material behaves less well, i.e. it burns and runs. It can be observed that the composition A that did not contain any filler behaved as well as the composition D which has the largest proportion of kaolin filler (40 parts). The compositions B and C, whose filler proportions were lower (10 parts and 20 parts) gave slightly poorer results.

Fire resistance was estimated using the tests IEC 332-1 and IEC 332-2, test IEC 332-2 being considered to be more demanding than test IEC 33-1. The principle consists in measuring the length L of the burnt portion of the sheath after exposure to a flame and after the corresponding combustion time T. The test is declared to be satisfactory (+) when two tests out of three are successful; otherwise, it is declared unsatisfactory (0). The compositions of the invention obtained satisfactory results overall. The prior art composition Z obtained an acceptable result for test IEC 332-1, but did not pass test IEC 332-2.

In conclusion, the best performance levels were observed for the composition A of the invention that did not contain filler, and for the compositions B and C having small proportions of filler. Overall, these performance levels are higher than those offered by prior art compositions. Incorporating the composition of the invention into the layer 9 of sheathing material makes it possible to achieve a significant increase in the mechanical characteristics, in fire resistance and fire propagation resistance.

Naturally, the present invention is not limited to the embodiments described. Rather, numerous variants of it are accessible to the person skilled in the art, without going beyond the spirit of the invention.

In particular, without going beyond the ambit of the invention, it is possible to modify the composition of the polymer matrix. The various secondary ingredients involved in forming the matrix, and their relative proportions, may be changed. Additives, in particular for facilitating shaping the covering, e.g. by extrusion, may be incorporated into it in minor proportions.

Although the invention is described in detail as applied to optical fiber cable sheaths, the invention is similarly applicable to providing fire protection for any type of cable used for telecommunications or for other types of cable.

What is claimed is:

1. A sheath for a cable, the sheath comprising, at least in part, a halogen-free intumescent composition containing a mixture of:
   a polymer matrix chosen from a polyethylene, a polypropylene, an ethylene copolymer, a propylene copolymer, a silicone, a polyamide, and a mixture thereof; and
   at least one flame-retardant additive constituted by a first inorganic compound having a lamellar crystal structure, and by a second inorganic compound inserted between the lamellae of said first compound, said second compound causing said lamellae to move apart under the effect of heat.

2. A sheath according to claim 1, wherein said first compound is chosen from a graphite and a phyllosilicate.

3. A sheath according to claim 1, wherein the first compound is a graphite.

4. A sheath according to claim 3, wherein said graphite has a flake size of no less than 45 $\mu$m.

5. A sheath according to claim 3, wherein said graphite has a flake size of no less than 100 $\mu$m.

6. A sheath according to claim 3, wherein said graphite has a flake size of no less than 300 $\mu$m.

7. A sheath according to claim 1, wherein said second inorganic compound is sulfuric acid.

8. A sheath according to claim 7, wherein said matrix is chosen from an ethylene and vinyl acetate copolymer, an ethylene and propylene copolymer, an ethylene and alkyl acrylate copolymer, an ethylene and acrylic acid copolymer, an ethylene terpolymer, and mixtures thereof.

9. A sheath according to claim 8, wherein said matrix is an ethylene and vinyl acetate copolymer.

10. A sheath according to claim 9, wherein said ethylene and vinyl acetate copolymer contains up to 80% by weight of vinyl acetate.

11. A sheath according to claim 10, wherein said ethylene and vinyl acetate copolymer contains in the range 10% by weight to 70% by weight of vinyl acetate.

12. A sheath according to claim 1, wherein said polymer matrix represents in the range 25% by weight to 85% by weight of said composition.

13. A sheath according to claim 12, wherein said polymer matrix represents in the range 30 parts by weight to 85 parts by weight of said composition.

14. A sheath according to claim 1, wherein said composition further contains an antioxidant.

15. A sheath according to claim 1, wherein said composition further contains a char source which is constituted by an organic compound that is rich in carbon and that contains functional groups forming char when they are exposed to heat.

16. A sheath according to claim 15, wherein said source is a polyamide.

17. A sheath according to claim 1, wherein said composition further contains a char enhancer chosen from compounds that release an inorganic acid at high temperature.

18. A sheath according to claim 17, wherein said enhancer is an ammonium polyphosphate.

19. A sheath according to claim 1, wherein said composition further includes a filler.

20. A sheath according to claim 19, wherein said filler is chosen from a mica, a clay, an inorganic oxide, a graphite, and mixtures thereof.

21. A sheath according to claim 20, wherein said filler represents no more than 40 parts of said composition.

22. A sheath according to claim 21, wherein said filler represents no more than 20 parts of said composition.

23. A sheath according to claim 1, wherein said composition is not cross-linked.

24. A cable made up of at least one core and at least one sheath according to claim 1.

25. A cable according to claim 24, wherein said core is constituted by an optical fiber.

26. A cable according to claim 24, wherein said core is constituted by a metal conductor.

27. A cable according to claim 24, wherein said composition is not cross-linked.

28. A method of manufacturing a cable according to claim 24, comprising a step of extruding a halogen-free intumescent composition around said core for forming a sheath, said composition containing a mixture of a polymer matrix chosen from a polyethylene, a polypropylene, an ethylene copolymer, a propylene copolymer, a silicone, a polyamide, and a mixture thereof, and at least one flame-retardant additive constituted by a first inorganic compound having a lamellar crystal structure, and by a second inorganic compound inserted between the lamellae of said first compound.

29. Use of a cable sheath according to claim 1, as a flame retardant in telecommunications cables.

* * * * *